US012751376B1

(12) United States Patent
Jones

(10) Patent No.: US 12,751,376 B1
(45) Date of Patent: Oct. 6, 2026

(54) MODULAR PLANTER SYSTEMS, METHODS, AND APPARATUS

(71) Applicant: Oliviine, Inc., Bellingham, WA (US)

(72) Inventor: Daniel Thomas Jones, Ferndale, WA (US)

(73) Assignee: Oliviine, Inc., Bellingham, WA (US)

( * ) Notice: Subject to any disclaimer, the term of this patent is extended or adjusted under 35 U.S.C. 154(b) by 89 days.

(21) Appl. No.: 18/407,155

(22) Filed: Jan. 8, 2024

Related U.S. Application Data

(60) Provisional application No. 63/478,922, filed on Jan. 7, 2023.

(51) Int. Cl.
*A01G 9/02* (2018.01)

(52) U.S. Cl.
CPC ..................................... *A01G 9/02* (2013.01)

(58) Field of Classification Search
CPC .......... A01G 9/02; A01G 9/247; A01G 9/028; A01G 27/00; A01G 9/023; A01G 9/025; A01G 9/0302
USPC ............................................................ 47/39
See application file for complete search history.

(56) References Cited

U.S. PATENT DOCUMENTS 1,499,165 A * 6/1924 France .................... A01G 9/02 47/41.13
1,989,403 A * 1/1935 Dauernheim .......... A01G 9/028 47/80
2,035,001 A 3/1936 Bliss
3,099,355 A * 7/1963 Kane ...................... A01G 9/028 211/75
3,293,798 A * 12/1966 Johnson, Sr. .......... A01G 9/023 47/83
3,542,210 A * 11/1970 Sorensen ............... A01G 9/045 47/75
3,760,534 A * 9/1973 Choux ................... A47G 7/041 211/85.23
3,810,329 A * 5/1974 Lecuru ................. A01G 9/0295 229/120.07
3,883,037 A * 5/1975 Seiller ..................... A47F 7/021 206/520
3,889,416 A * 6/1975 Bergeron ............... B65D 25/02 211/74
4,242,834 A * 1/1981 Olsen .................. A01G 9/0295 47/75
4,276,720 A * 7/1981 Lyon ...................... A01G 27/04 47/14

(Continued)

FOREIGN PATENT DOCUMENTS

CN 206923359 U 1/2018
CZ 33093 U1 11/2018

(Continued)

OTHER PUBLICATIONS

Lacy Cooke, Build your own indoor garden with modular Lego-like blocks, Retrieved on Nov. 2, 2022 from https://inhabitat.com/build-your-own-indoor-garden-with-modular-lego-like-blocks/, 12 pages.

*Primary Examiner* — Maria E Graber
(74) *Attorney, Agent, or Firm* — Michael R. Schacht; Bronte Brillantes; Schacht Law Office, Inc.

(57) ABSTRACT

A plant container assembly for a planter system comprising a saddle, a vessel supported by the saddle, a lid supported by the vessel, and at least one basket supported by the lid.

18 Claims, 8 Drawing Sheets

(56) References Cited

U.S. PATENT DOCUMENTS

| | | | | | |
|---|---|---|---|---|---|
| 4,355,485 | A * | 10/1982 | Frank | A01G 9/023 47/82 |
| 4,551,943 | A * | 11/1985 | Pas | A47G 7/041 47/41.01 |
| 4,561,208 | A * | 12/1985 | Schultz | A01G 9/023 D11/143 |
| 4,793,097 | A * | 12/1988 | Whitcomb | A01G 9/0297 211/74 |
| 4,996,792 | A * | 3/1991 | Holtkamp, Sr. | A01G 27/04 47/79 |
| 5,279,070 | A * | 1/1994 | Shreckhise | A47G 7/025 47/66.7 |
| 5,345,712 | A * | 9/1994 | Lambert | A01G 9/028 47/87 |
| 5,426,890 | A * | 6/1995 | Dummen | A01G 9/0295 47/87 |
| 5,511,342 | A | 4/1996 | Maso | |
| 5,867,938 | A * | 2/1999 | DiLernia | A01G 9/02 47/65.5 |
| 5,896,699 | A * | 4/1999 | Livingston | A47G 7/041 47/39 |
| 7,832,147 | B2 * | 11/2010 | Weast | A01G 9/024 47/86 |
| 8,341,884 | B2 * | 1/2013 | Rodrigues | A01G 9/025 47/82 |
| 9,113,600 | B2 * | 8/2015 | Wu | A01G 9/02 |
| 9,572,306 | B2 * | 2/2017 | Chiang | A01G 9/023 |
| 10,477,786 | B1 * | 11/2019 | Wilson | A01G 9/042 |
| 10,750,688 | B2 * | 8/2020 | Arnau | A01G 31/02 |
| 11,051,461 | B2 * | 7/2021 | Kiessling | A01G 9/023 |
| 11,516,971 | B2 * | 12/2022 | Chung | A01G 9/023 |
| 2005/0262768 | A1 * | 12/2005 | Cybula | A01G 9/023 47/83 |
| 2006/0032117 | A1 * | 2/2006 | Lehman | A01G 9/081 47/39 |
| 2007/0137101 | A1 * | 6/2007 | van Heugten | A01G 9/0295 47/65.5 |
| 2008/0155896 | A1 * | 7/2008 | Chen | A01G 9/16 47/65.5 |
| 2009/0119987 | A1 * | 5/2009 | Ingrassia | A01G 9/028 47/66.5 |
| 2009/0205251 | A1 * | 8/2009 | Irmler | A01G 9/02 47/79 |
| 2010/0229464 | A1 * | 9/2010 | Wilkes | A01G 9/023 47/82 |
| 2012/0005956 | A1 * | 1/2012 | Whistle | A01G 27/02 47/79 |
| 2014/0182202 | A1 * | 7/2014 | Wilmot | A01G 27/04 47/81 |
| 2014/0259913 | A1 * | 9/2014 | Adams | A01G 9/02 47/65.5 |
| 2015/0047258 | A1 * | 2/2015 | Lewis | A01G 9/023 47/79 |
| 2016/0360710 | A1 * | 12/2016 | Merzweiler | A01G 9/028 |
| 2018/0242531 | A1 * | 8/2018 | Berry, III | A01G 9/02 |
| 2020/0267909 | A1 | 8/2020 | Chung | |
| 2021/0228002 | A1 * | 7/2021 | Gouldstone | A01G 9/02 |
| 2022/0104443 | A1 * | 4/2022 | Chang | A01K 63/04 |
| 2022/0217916 | A1 | 7/2022 | Choi et al. | |
| 2022/0354065 | A1 * | 11/2022 | O'Brien | A01G 9/023 |
| 2023/0371443 | A1 * | 11/2023 | Eek | A01G 9/0295 |

FOREIGN PATENT DOCUMENTS

| | | | |
|---|---|---|---|
| DE | 102019100931 | A1 | 7/2020 |
| FR | 2881934 | A1 | 8/2006 |
| GB | 2029802 | A | 3/1980 |
| KR | 101873200 | B | 7/2018 |
| KR | 102125792 | B1 | 6/2020 |
| WO | 2004086851 | A1 | 10/2004 |
| WO | 2015121094 | A1 | 8/2015 |

* cited by examiner

MODULAR PLANTER SYSTEMS, METHODS, AND APPARATUS

RELATED APPLICATIONS

This application, U.S. patent application Ser. No. 18/407,155 filed Jan. 8, 2024 claims benefit of U.S. Provisional Application Ser. No. 63/478,922 filed Jan. 7, 2023, the contents of which are incorporated herein by reference.

TECHNICAL FIELD

The present invention relates to plant container systems, methods, and apparatus, and, in particular, to modular planter systems, methods, and apparatus that can be reconfigured to fit the functional and aesthetic needs of the user.

BACKGROUND

Plant container systems typically serve both functional and aesthetic purposes. At a minimum, plant containers are designed hold a growing media such as soil appropriate for a plant or plants to be grown. Plant containers may also have additional features to facilitate watering, replacement of growing media, and cleaning, and the like. Plant containers, such as pots, are also typically manufactured with decorative features to provide a desirable aesthetic.

SUMMARY

The present invention may be embodied as a plant container assembly for a planter system comprising a saddle, a vessel supported by the saddle, a lid supported by the vessel, and at least one basket supported by the lid.

The present invention may be embodied as a plant container system comprising first and second plant container assemblies and a plurality of leg assemblies. The first and second plant container assemblies each comprise a saddle defining at least one leg opening, a vessel supported by the saddle, a lid supported by the vessel, and at least one basket supported by the lid. Each leg assembly is configured to engage at least one leg opening of each of the first and second plant container assemblies. At least a portion of each leg assembly is arranged within the leg openings of the first and second plant containers such that the first and second plant containers are supported in a desired orientation relative to each other.

The present invention may also be embodied as a method of forming a plant container system comprising the following steps. First and second plant container assemblies are provided. Each of the first and second plant container assemblies comprises a saddle defining at least one leg opening, a vessel supported by the saddle, a lid supported by the vessel, and at least one basket supported by the lid. A plurality of legs assemblies is provided, where each leg assembly is configured to engage at least one leg opening of each of the first and second plant container assemblies. At least a portion of each leg assembly is arranged within the leg openings of the first and second plant containers such that the first and second plant containers are supported in a desired orientation relative to each other.

DETAILED DESCRIPTION

Figure 1:
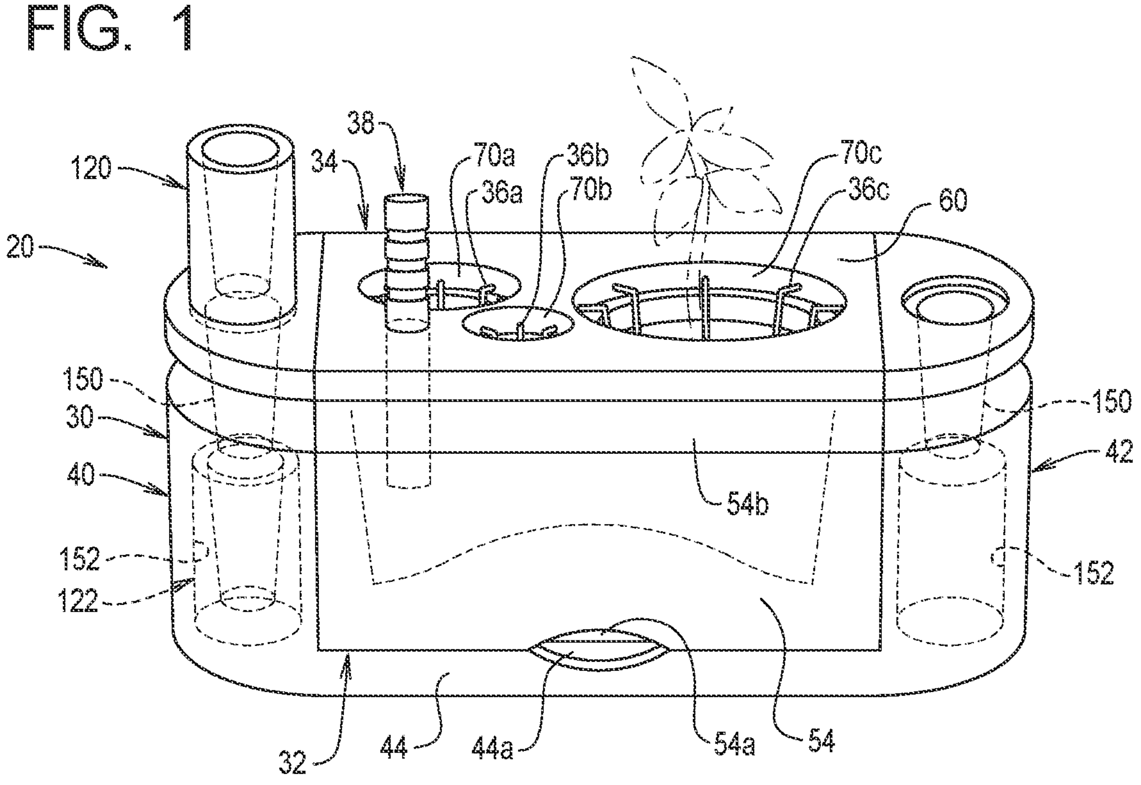
FIG. 1 is a front perspective view illustrating a first example plant container assembly of a first example modular planter system of the present invention.
Figure 2:
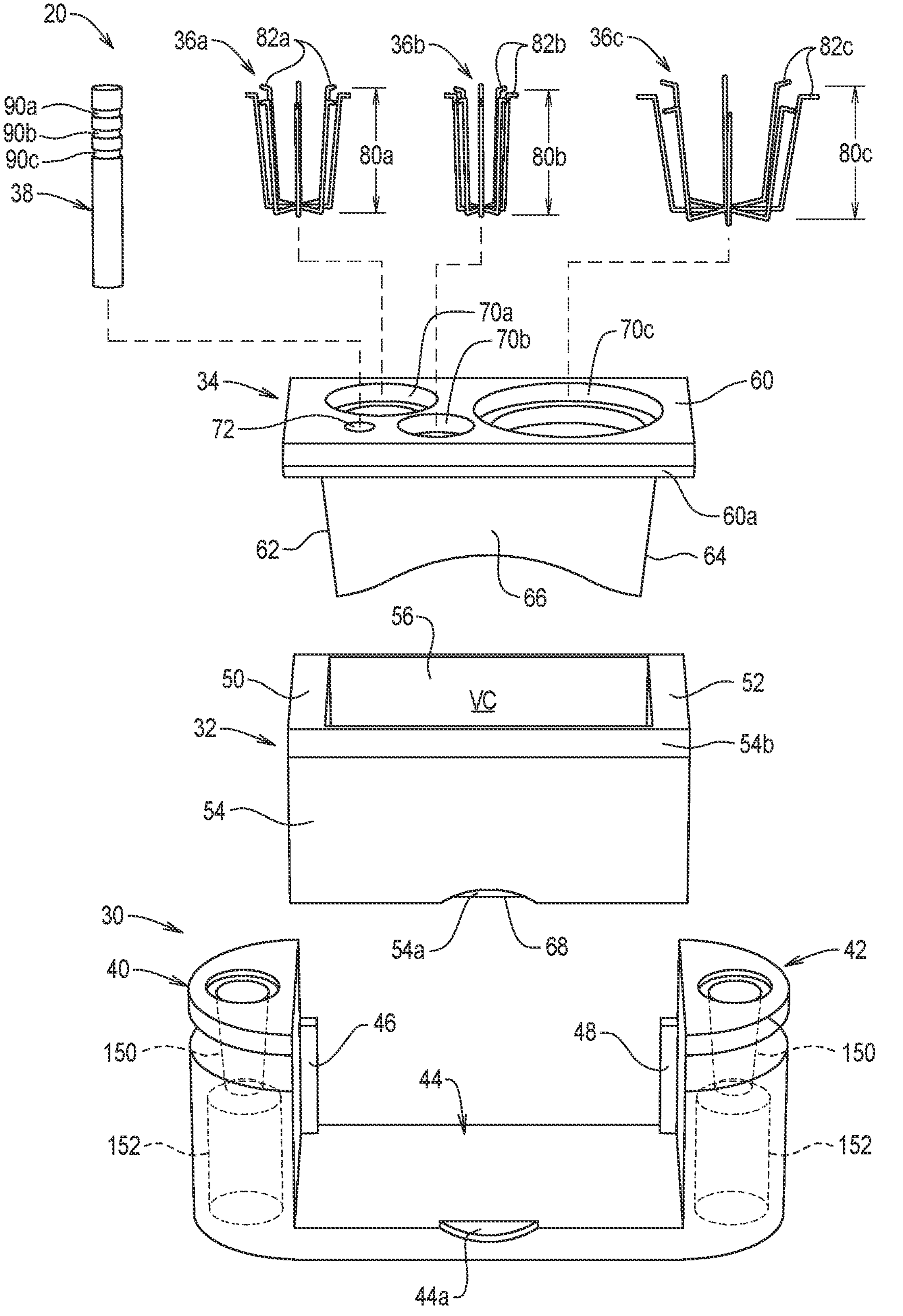
FIG. 2 is an exploded view illustrating components of the first example plant container assembly.

The present may be embodied as one or more plant container assemblies, one or more plant container systems, and one or more modular planter systems and methods. In particular, the example plant container assemblies, and associated leg components, form a modular planter system that may be reconfigured to form one or more of the plant container systems as desired by the user. Below three example plant container assemblies, three example plant container systems, and example leg components will be described, and various combinations of these components to form the example plant container systems will be described.

I. First Example Plant Container Assembly

Referring initially to FIGS. 1-10 of the drawing depicted therein is a first example plant container assembly 20 constructed in accordance with, and embodying, the principles of the present invention. The first example plant container assembly 20 comprises a saddle 30, a vessel 32 defining a vessel chamber VC, a lid 34, one or more baskets 36, and a bobber 38. The example plant container assembly 20 comprises three baskets 36*a*, 36*b*, and 36*c* but can be configured with zero, one, two, or three of the baskets 36.

The example saddle 30 comprises first and second end portion 40 and 42, a spacing portion 44, and first and second guide portions 46 and 48. A front spacing portion notch 44*a* is formed in the example spacing portion 44.

The example vessel 32 comprises a vessel first end wall 50, a vessel second end wall 52, a vessel first side wall 54, a vessel second side wall 56, and a vessel bottom wall 58. The example vessel first side wall 54 defines a vessel first side wall notch 54*a* and a first side wall beveled edge 54*b*. The example vessel second side wall 56 defines a first second side wall guide recess 56*a*, a second side wall guide recess 56*b*, and a second side wall beveled edge 56*c*. The vessel walls 50, 52, 54, 56, and 58 are configured such that the vessel chamber VC is capable of containing growing media such as fluid or water during normal use of the first example plant container assembly 20 and such that the vessel chamber VC can be accessed from above for replacement and/or replenishment of the growing media.

The example lid 34 comprises a lid upper wall 60, a lid first end wall 62, a lid second end wall 64, a lid first side wall 66, and a lid second side wall 68. Formed in the lid upper wall 60 are first and second lid upper wall beveled edges 60*a* and 60*b*. Also formed in the example lid upper wall 60 is at least one basket opening 70 and, optionally, one or more bobber openings 72. A basket support ledge 74 is formed within or adjacent to each basket opening 70. The example lid 34 defines first, second, and third basket openings 70*a*, 70*b*, and 70*c*, and first, second, and third basket support ledges 74*a*, 74*b*, and 74*c* are associated with the first, second, and third basket openings 70*a*, 70*b*, and 70*c*, respectively.

Each basket(s) 36 defines a basket plant portion 80 and a basket lid portion 82. In the first example plant container 20, the first basket 36*a* defines a basket plant portion 80*a* and a basket lid portion 80*a*, the second basket 36*b* defines a basket plant portion 80*b* and a basket lid portion 80*b*, and the third basket 36*c* defines a basket plant portion 80*c* and a basket lid portion 80*c*. In the first example plant container assembly 20, first, second, and third basket openings 70*a*, 70*b*, and 70*c* are of different sizes. Correspondingly, the first, second, and third baskets 36*a*, 36*b*, and 36*c*, which are sized and dimensioned to be supported by the basket support ledges 74*a*, 74*b*, and 74*c*, respectively, are also of different sizes. However, the basket openings 70 and baskets 36 may be the same size.

The example bobber 38 is a buoyant member capable of floating in liquid such as water. The example bobber 38 is cylindrical, but other shapes may be used in addition or instead. The example bobber 38 comprises at least one depth marker 90 configured to communicate a fluid level of liquid within the vessel chamber VC by referencing the relative locations of the depth marker 90 and the lid upper wall 60. The example bobber 38 comprises three perimeter grooves 90*a*, 90*b*, and 90*c* forming the markers 90, but the markers 90 are optional and fewer or more than three markers may be used. In addition, other markers, such as paint, ink, adhesive strips, or the like, may be used in addition or instead of the grooves 90*a*, 90*b*, and 90*c*.

To form the first example plant container assembly 20 using the saddle 30, vessel 32, lid 34, basket(s) 36, and optional bobber 38, the vessel 30 is first arranged between the end portions 40 and 42 and on top of the spacing portion 44 of the saddle 30. In this arrangement, the guide portions 46 and 48 of the saddle 30 engage the guide recesses 56*a* and 56*b*, respectively, of the vessel 32, to align the various adjacent surfaces of the saddle 30 and vessel 32 as shown in FIGS. 1 and 3-10. Further, when the example saddle 30 properly supports the example vessel 32, the first side wall notch 54*a* of the vessel 32 is adjacent to the first spacing portion notch 44*a* of the saddle 30. The notches 56*a*, 56*a*, 44*a*, and 54*a* facilitate removal of the vessel 32 from the saddle 30. Although one pair of mating notches 44*a* and 54*a* is depicted, similar aligned notches may be formed on the back walls of the saddle 30 and vessel 32.

With the vessel 32 supported by the saddle 30, the lid 34 is arranged such that the lid walls 62, 64, 66, and 68 extend into the vessel chamber VC such that the lid upper wall engages the vessel walls 50, 52, 54, and 56. In the first example plant container assembly 20, the lid walls 62, 64, 66, and 68 frictionally engage the vessel walls 50, 52, 54, and 56, respectively, to inhibit removal of the lid 34 from the vessel chamber 32. With the lid 34 so supported by the vessel 32, the lid upper wall first and second beveled edges 60*a* and 60*b* of the lid 34 are adjacent to the first and second side wall beveled edges 54*b* and 56*d* of the vessel 32. The first pair of aligned beveled edges 54*b* and 60*a* and second pair of aligned beveled edges 56*d* and 60*b* facilitate removal of the lid 34 from the vessel 32.

At this point, the baskets 36*a*, 36*b*, and 36*c* are arranged such that the basket plant portions 80*a*, 80*b*, and 80*c* are extended through the lid basket openings 70*a*, 70*b*, and 70*c*, until the basket lid portions 82*a*, 82*b*, and 82*c* engage and are supported by the lid basket support ledges 74*a*, 74*b*, and 74*c*, respectively. At this point, the basket plant portions 80*a*, 80*b*, and 80*c* are suspended within the vessel chamber VC. When the baskets 36 are properly supported by the lid 34, plants supported by the basket plant portion(s) 80 may obtain nutrients from any growing media within the vessel chamber VC.

The optional bobber 38 may then be inserted into the lid bobber opening 72 such that a portion of the bobber 38 extends into and is supported by liquid (e.g., water) within the vessel 32 and at least a portion of the depth marks 90 are visible above the lid upper wall 60. The depth of the liquid will determine how much or many of the depth marks 90 are visible to the user. The user thus can determine a depth of liquid within the vessel 32 without removing the lid 34.

To replace or replenish growing media within the vessel chamber VC or to clean the first example plant container assembly 20, the baskets 36 (containing plants) may be lifted out of the lid basket openings 70 and/or the lid 34 removed from the vessel 32. New growing media may be arranged within the vessel 32 with the baskets 36 and/or lid 34 removed. By removing the baskets 36 from the lid 34 and the lid 34 from the vessel 32, the saddle 30 and/or the lid 32 may be cleaned as appropriate. Further, by disassembly the lid 34, the baskets 36, and the vessel 32, the saddle 30 may be cleaned as appropriate. The lid walls 62, 64, 66, and 68 may be sized and dimensioned relative to the basket plant portions 80 such that, if the lid 32 is removed from the vessel 32 with the baskets 36 supported thereby, the lid 32 may be set on a temporary support surface without damaging plants supported by the baskets 36 because the plant material is at least partly suspended above the temporary support surface.

The example saddle 30, vessel 32, lid 34, and/or bobber 38 substantially define the look and feel of the first example plant container assembly 20. Because planters and planter systems have a strong aesthetic component, the saddle 30, vessel 32, lid 34, and/or bobber 38 are made of materials and shapes and in colors that provide a desirable aesthetic appearance to the first example plant container assembly 20. For example, as mentioned above, the upper wall beveled edges 60*a* and 60*b* and the first and second side wall beveled edges 54*b* and 56*c* are adjacent to each other to facilitate removal of the lid 34 from the vessel 32. The upper wall beveled edges 60*a* and 60*b* and the first and second side wall beveled edges 54*b* and 56*c* thus form an elongate V-groove along the front and rear of the first example plant container assembly 20. To improve the look of the first example plant container assembly 20, this V-groove is continued along the first and second end portions 40 and 42 of the saddle 30 such that the V-groove continues around the entire first example plant container assembly 20 just below an upper surface of the lid upper wall 60.

While certain aspects of ornamental features of the groove formed by the upper wall beveled edges 60*a* and 60*b* and the first and second side wall beveled edges 54*b* and 56*c* are functional, the exact aesthetic look of any of these features is arbitrary and may be altered while still yielding the functional features of the first example plant container assembly 20 as described herein. In this context, plant container assemblies of the present invention may be made using different materials, shapes, and/or colors from those employed by the first example plant container assembly 20 depending upon the aesthetic look and feel intended to be exhibited by such alternative plant container assemblies of the present invention.

II. Example Legs

Figure 11A:
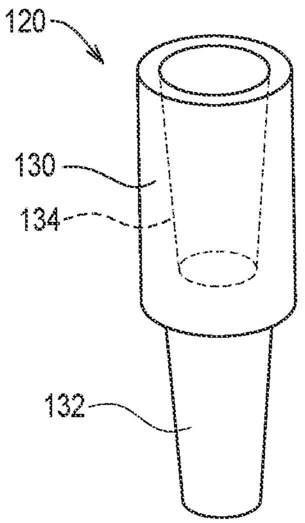
FIG. 11A is a front perspective view of a primary leg that may be used as part of the first example modular planter system of the present invention.
Figure 12:
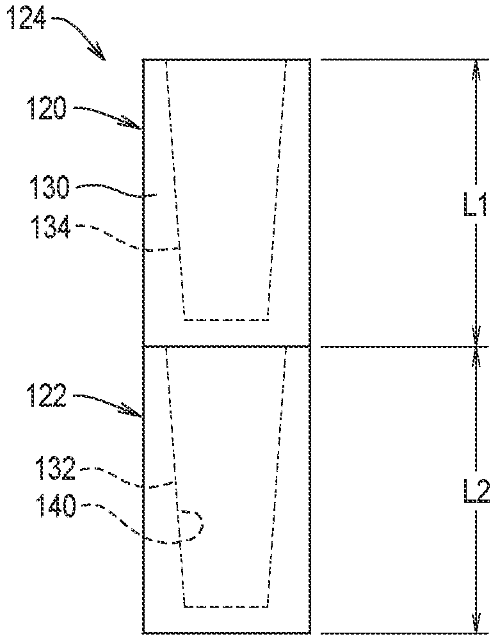
FIG. 12 is a front elevation view of an example leg assembly that may be formed by the primary leg and the secondary leg and used as part the first example modular planter system of the present invention.
Figure 11B:
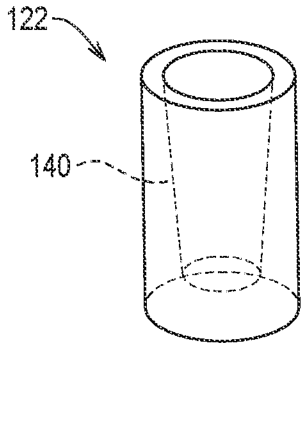
FIG. 11B is a front perspective view of a secondary leg that may be used as part of the first example modular planter system of the present invention.

Turning now to FIGS. 11A, 11B, and 12, depicted therein are a primary leg 120 and a secondary leg 122. FIG. 12 further illustrates that the primary leg 120 and the secondary leg 122 may be combined to form a leg assembly 124.

The example primary leg 120 defines a primary leg first portion 130 and a primary leg second portion 132. The example primary leg first portion 130 is substantially cylindrical, and the example primary leg second portion 132 is substantially frustoconical. In the example primary leg 120, a primary leg cavity 134 formed in the primary leg first portion 130. The example primary leg cavity 134 is configured to accommodate a shape substantially the same as the example primary leg second portion 132. In particular, the example primary leg cavity 134 is also substantially frustoconical.

The example secondary leg 122 defines a secondary leg cavity 140. Like the example primary leg cavity 134, the example secondary leg cavity 140 is configured to accommodate a shape substantially the same as the example primary leg second portion 132. In particular, the example secondary leg cavity 134 is also substantially frustoconical. Further, the secondary leg 122 has substantially the same dimensions as the primary leg first portion 130 and is thus substantially cylindrical.

Figure 18:
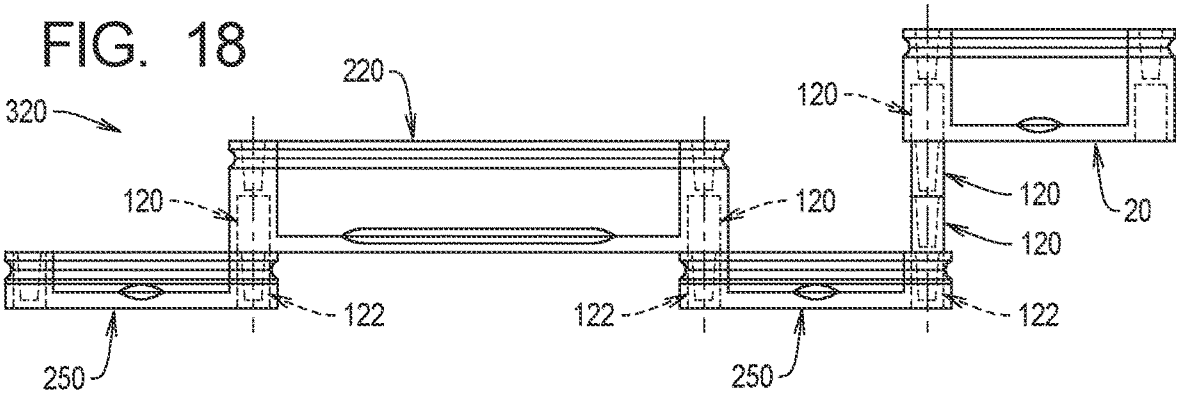
FIG. 18 is a front elevation assembled view of the first example plant system formed using plant container assemblies and leg assemblies of the first example modular plant system of the present invention.
Figure 19:
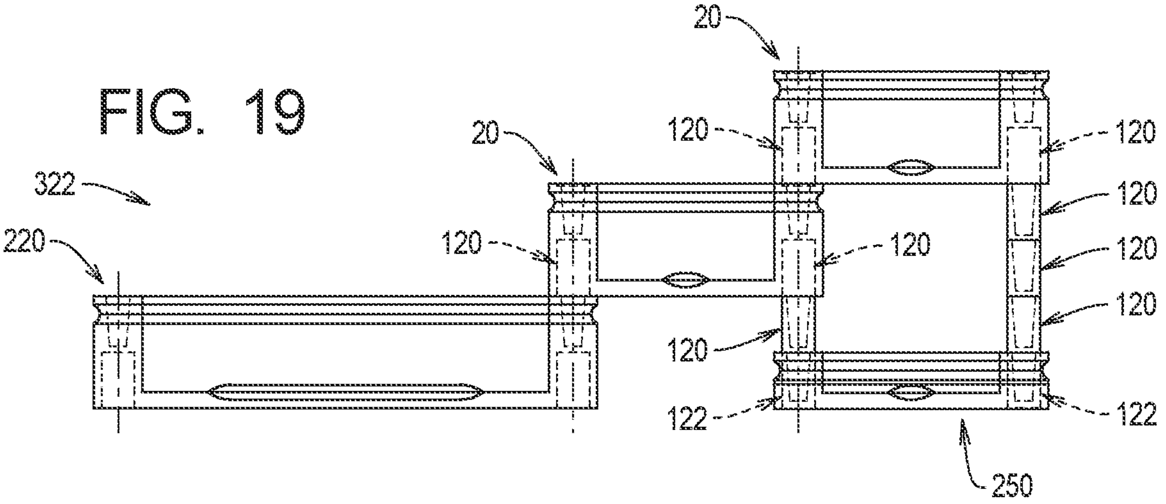
FIG. 19 is a front elevation assembled view of a second example plant system formed using plant container assemblies and leg assemblies of the first example modular plant system of the present invention.

The cylindrical shapes of the primary leg first portion 130 and secondary leg 122 and the frustoconical shapes of the primary leg second portion 132, primary leg cavity 134, and secondary leg cavity 140 are designed to complement each other to allow the primary leg 120 to be attached to the secondary leg 122 (e.g., FIG. 12) and/or to the saddle 30 (e.g., FIGS. 18 and 19).

As shown in FIG. 12, the leg assembly 124 may be formed by inserting the primary leg second portion 130 of any primary leg 132 into the secondary leg cavity 140 of any secondary leg 122. The primary leg second portion(s) 132 and the secondary leg cavity(ies) 140 are similarly sized and dimensioned (complementary) such that a friction fit is formed between the primary leg 120 and the secondary leg 122 that inhibits inadvertent disassembly of the leg assembly 124.

Further, in the first example plant assembly 20, each of the example first and second end portions 40 and 42 of the example saddle 30 define a first leg cavity 150 and a second leg cavity 152. During normal use of the first example plant container assembly 20, the example first leg cavity(ies) 150 are accessible from above the saddle 30 and the example second leg cavity(ies) 152 are accessible from below the saddle 30. Further, the first leg cavity(ies) 150 are configured to accommodate a shape substantially the same as the example primary leg second portion 132, while the second leg cavity(ies) 152 are configured to accommodate a shape substantially the same as the secondary leg 122.

The first leg cavity(ies) 150 and primary leg second portion(s) 132 are thus sized and dimensioned (complementary) such that, when one of the second leg portions 132 is inserted into any of the first leg cavities 150, a friction fit is formed between the primary leg 120 and the saddle 30 that inhibits inadvertent disassembly of the primary legs 120 from the saddle 30. The second leg cavity(ies) 152 and the secondary legs 122 are similarly sized and dimensioned (complementary).

Accordingly, when one of the primary leg second leg portions 132 is inserted into any of the first leg cavities 150, a friction fit is formed between the primary leg 120 and the saddle 30 that inhibits inadvertent disassembly of the primary legs 120 from the saddle 30. Similarly, when one of the secondary legs 122 is inserted into any of the second leg cavities 152, a friction fit is formed between the secondary leg 122 and the saddle 30 that inhibits inadvertent disassembly of the secondary legs 122 from the saddle 30. Further, the friction fit between the primary legs 120 and secondary legs 122 mean that a leg assembly 124 may also be arranged such that, when the primary leg first leg portion 130 of the leg assembly 124 is inserted into any of the second leg cavities 152, a friction fit is formed between the leg assembly 124 and the saddle 30 that inhibits inadvertent disassembly of the leg assembly 124 from the saddle 30.

In addition, lengths L1 and L2 of the primary leg first portion 130 and of the secondary leg 122 are the same and are predetermined such that twice L1 and L1+L2 both equal an effective height of the first example plant container assembly 20. The primary leg 120 may be combined with one or more other primary legs and/or one of the secondary legs 122 in a modular manner to create numerous configurations of plant container systems as will be described in further detail below.

III. Second Example Plant Container Assembly

Figure 13:
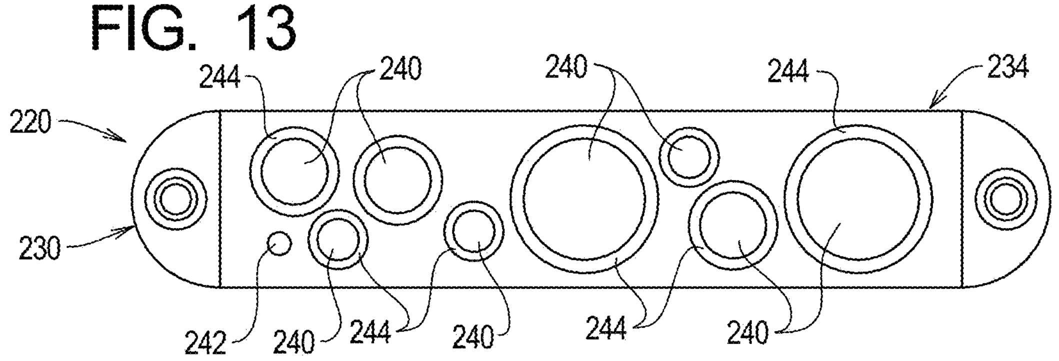
FIG. 13 is top plan view of a second example plant container assembly of the first example modular planter system of the present invention.
Figure 14:
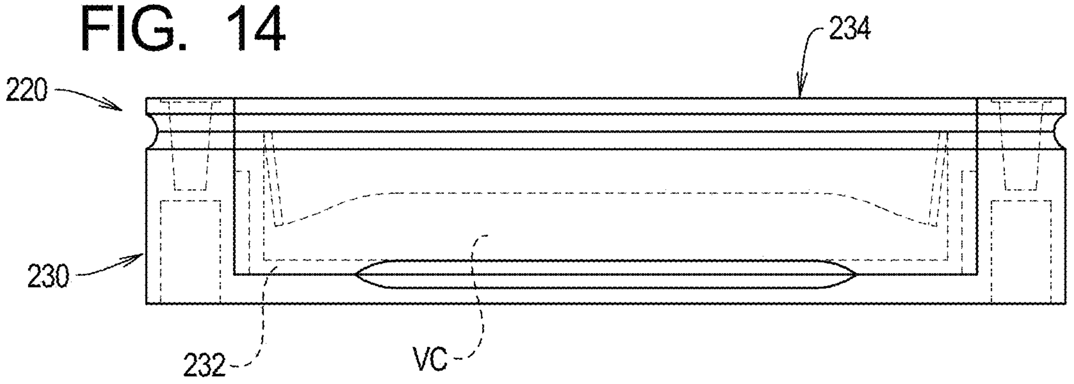
FIG. 14 is front elevation view of the second example plant container assembly.

Turning now to FIGS. 13 and 14 of the drawing, depicted therein is a second example plant container assembly 220 constructed in accordance with, and embodying, the principles of the present invention. The second example plant container assembly 220 comprises a saddle 230, a vessel 232 defining a vessel chamber VC, a lid 234, one or more baskets (not shown), and, optionally, a bobber (not shown).

Except as will be described below, the second example plant container assembly 220 is manufactured and used in substantially the same manner as the first example plant container assembly 20. The second example plant container assembly 220 will thus be described only to the extent that the second example plant container assembly 220 differs from first example plant container assembly 20.

In particular, the second example plant container assembly 220 differs from first example plant container assembly 20 in effective length (as generally determined by lengths of the saddle and vessel) and the number of lid basket openings defined by the vessel 232.

Figure 4:
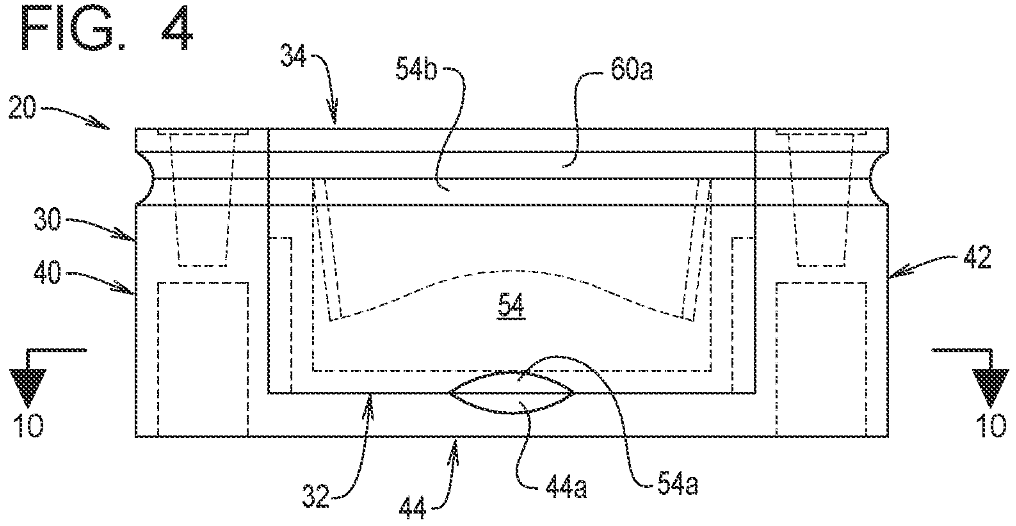
FIG. 4 is a front elevation view of the first example plant container assembly.
Figure 5:
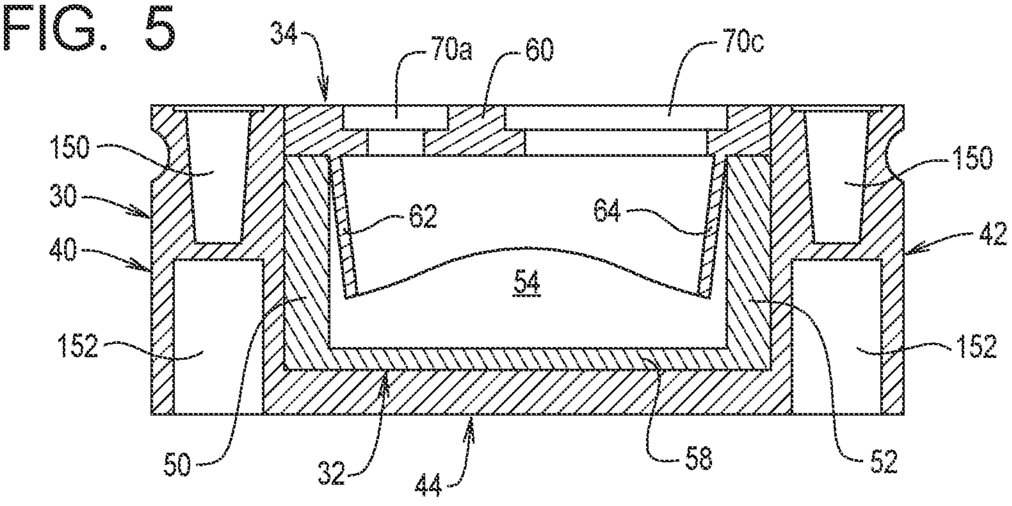
FIG. 5 is a section view taken along lines 5-5 in FIG. 3.
Figure 6:
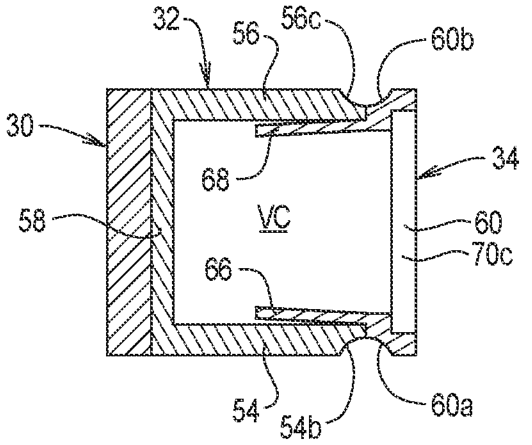
FIG. 6 is a section view taken along lines 6-6 in FIG. 3.
Figure 7:
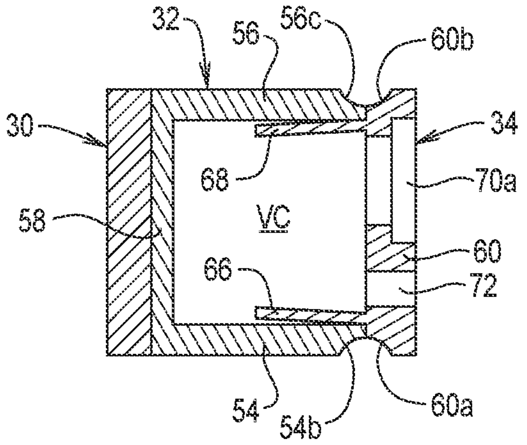
FIG. 7 is a section view taken along lines 7-7 in FIG. 3.
Figure 8:
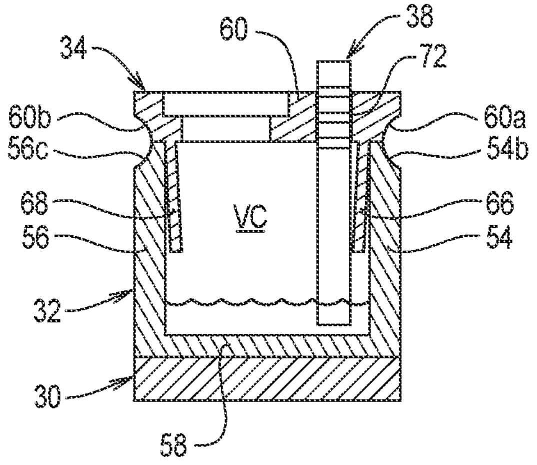
FIGS. 8 and 9 are section views illustrating operation of a bobber member of the first example modular planter system.
Figure 9:
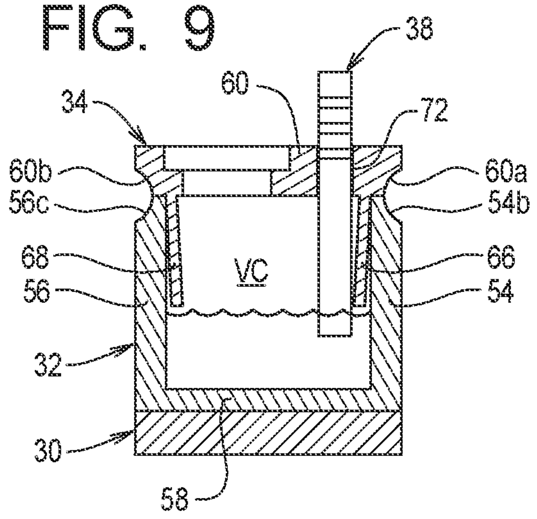
Figure 10:
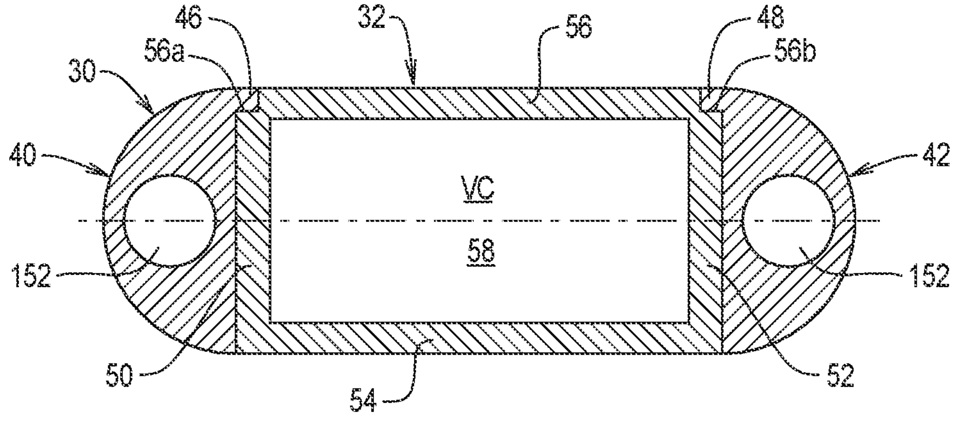
FIG. 10 is a section view taken along lines 10-10 in FIG. 4.

As can be seen by a comparison of FIGS. 4 and 14, the heights of the first and second plant container assemblies 20 and 220 are substantially the same, but the length of the second plant container assembly 220 is greater relative to height than the length of the first plant container assembly 20. In particular, a length of the second plant container assembly 220 is substantially twice the length of the first plant container assembly 20.

Figure 3:
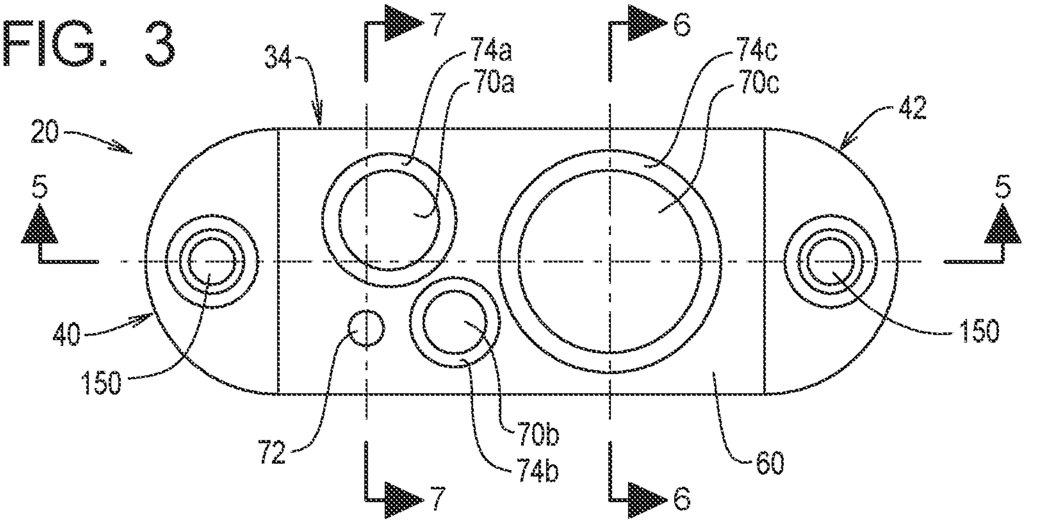
FIG. 3 is top plan view of the first example plant container assembly.

Further, a comparison of FIGS. 3 and 13 illustrates that, while the first example plant container assembly 20 defines three lid basket openings 70 and a bobber opening 72, the second example plant container assembly 220 defines eight basket openings 240 and a bobber opening 242. Like the basket openings 70, the basket openings 240 are of a plurality of different sizes (e.g., diameters). Similarly, like the basket openings 70, each of the basket openings 240 is associated with a corresponding basket support ledge 244.

VI. Third Example Plant Container Assembly

Figure 15:
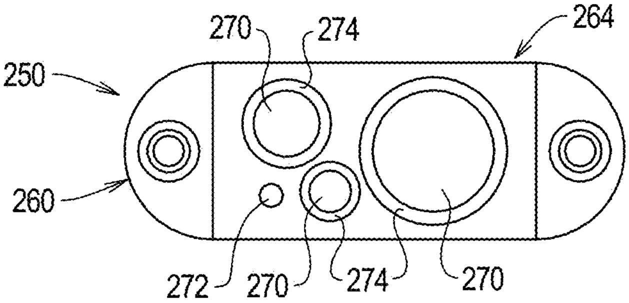
FIG. 15 is top plan view of a third example plant container assembly of the first example modular planter system of the present invention.
Figure 16:
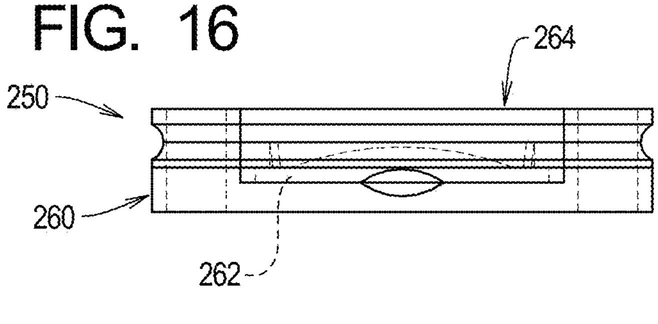
FIG. 16 is front elevation view of the third example plant container assembly.

Turning now to FIGS. 15 and 16 of the drawing, depicted therein is a third example plant container assembly 250 constructed in accordance with, and embodying, the principles of the present invention. The third example plant container assembly 250 comprises a saddle 260, a vessel 262 defining a vessel chamber VC, a lid 264, one or more baskets (not shown), and, optionally, a bobber (not shown). Like the first example plant container assembly 20, the third example plant container assembly defines three lid basket openings 270 and a bobber opening 272.

Except as will be described below, the third example plant container assembly 250 is manufactured and used in substantially the same manner as the first example plant container assembly 20. The third example plant container assembly 250 will thus be described only to the extent that the third example plant container assembly 250 differs from first example plant container assembly 20.

In particular, the third example plant container assembly 250 differs from first example plant container assembly 20 in effective height (as generally determined by height of the saddle). As can be seen by a comparison of FIGS. 4 and 16, the lengths of the first and second plant container assemblies 20 and 250 are substantially the same, but the height of the second plant container assembly 250 is less relative to height than the height of the first plant container assembly 20. In particular, a height of the second plant container assembly 250 is substantially half of that of the height of the first example plant container assembly 20. A close examination of the drawing indicates that the effective height of the first example plant container assembly 20 is approximately the same as a longitudinal length of the primary leg first portion 130 of the primary leg 120 and of the secondary leg 122.

V. First Example Plant Container System

Figure 17:
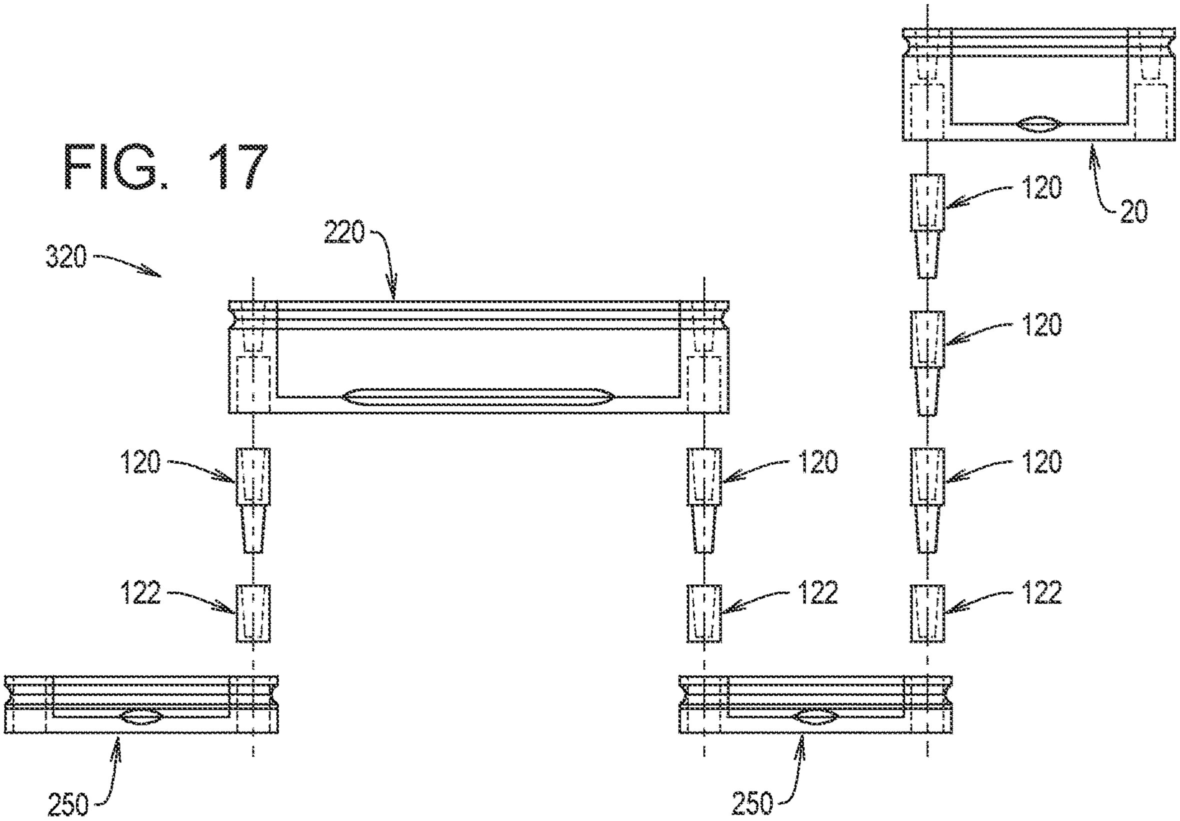
FIG. 17 is a front elevation exploded view of a first example plant system formed using components of the first example modular plant system of the present invention.

Using one first example plant container assembly 20, one second example plant container assembly 220, two third example plant container assemblies 250, five primary legs 120, and three secondary legs 122, a first example plant container system 320 can be formed as shown in FIGS. 17 and 18. If necessary, additional primary and secondary legs 120 and 122 may be combined to support the first example plant container assembly 20 forming part of the first example plant container system 320.

VI. Second Example Plant Container System

Using two first example plant container assemblies 20, one second example plant container assembly 220, one third example plant container assembly 250, seven of the primary legs 120, and two of the secondary legs 122, a second example plant container system 322 can be formed as shown in FIG. 19.

VII. Third Example Plant Container System

Figure 20:
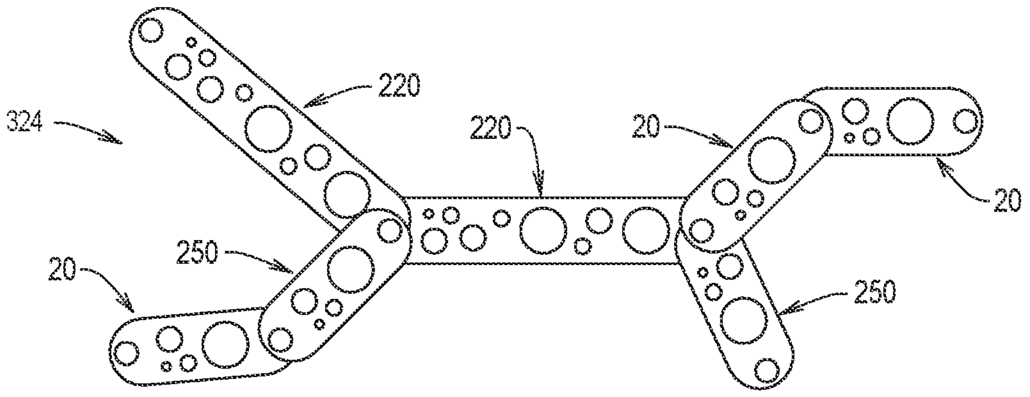
FIG. 20 is a top plan view of a third example plant system formed using plant container assemblies and leg assemblies of the first example modular plant system of the present invention.

FIG. 20 illustrates a top plan view of a third example plant container system 324 comprising one or more first example plant container assembly 20, two or second example plant container assemblies 220, and one or more of the third example plant container assemblies 250. Although not visible in the top plan view of FIG. 20, the third example plant container system 324 also comprises one or more of the primary legs 120 and one or more of the secondary legs 122.

VII. Additional Considerations

In the modular planter systems and methods depicted in the drawing and described herein, a standard or primary unit is the first example plant container system 20. As described above, sizes and dimensions of the primary leg 120, the secondary leg 122, the leg assembly 124, the second example plant container assembly 220, and the third example plant container assembly 250 are derived from the sizes and dimensions of the standard or primary unit formed by the first example plant container system 20. The purpose of the modular planter system of the present invention is to house a variety of plants and vegetables and facilitate the growth and associated maintenance of such growth and maintenance.

Features of the planter system of the present invention include:

- water level indication
- variety of hole sizes (addressing plant sizes)
- removeable vessels
- removable lid (with plants)
- wire baskets (hold plants in lid)
- stack ability
- pivoting of stacked units
- ergonomic grooves and cutouts for handling.

The components of the modular planter system of the invention are intended to be stacked together in a variety of configurations as shown allowing for creative personalization. The components of the present invention may be formed of a variety of materials such as metal, plastic, wood, or the like, but the example modular planter system depicted in FIGS. 1-20 is made of earthenware material.

The example bobber 38 is a thin-walled, hollow, plastic member configured to be inserted into a bobber opening 72, 242, and 272, or other or through an appropriately sized hole, in the top of the table lid 34, 234, 264. The bobber 38 allows for the visual monitoring of water levels within the vessel that would otherwise be unseen behind the opaque walls of the unit.

The example baskets 36 are metal, wire baskets that are set into place within the basket opening holes 70, 240, or 270 in the top of the table lid 34, 234, 264 on the inset ledges 74, 244, and/or 274 of each opening hole. These baskets contain the specific plants being grown within this unit, keeping the roots elevated above the floor on the inside of the vessel 32, 232, or 262.

The lid 34, 234, and 264 sets into the top opening of the vessel 32, 232, or 262, allowing the proper submersion of the roots of a variety of plants in water or soil. The lid 34, 234, and 264 also has walls extending down from the top surface so that when the lid is pulled from the vessel along with the plants and set to the side on a surface, the roots of the plants are protected from being crushed and allows for the easier cleaning and refilling of the vessel.

The vessel 32, 232, 262 is supported by the saddle 30, 230, 260 of the planter system of the invention unit and houses all previously described components. The main purpose of the vessel component 32, 232, 262 is to contain water or soil or other appropriate fillings. The vessel 32, 232, 262 also allows for the removal of the plants and water from the stacked system for cleaning and refill without having to completely dismantle the stacked system.

The stacking saddle component 30, 230, 260 allows for the stacking of the units in desired configurations. Either end of the component possesses inlets for peg portions of the leg members 120 and 122 for the connecting of individual units in a stacked configuration. The circular nature of the connection points formed by the example leg members 120 and 122 allow for the pivoting of units around these points as shown in FIG. 20. The example stacking saddle 30, 230, 260 has a finger pull indentation and ergonomic grooves as described above.

The first (primary) and second (secondary) example pegs slide into similarly shaped holes in the top and bottom of the saddle of each unit allowing for connecting individual units in a stacked configuration. The secondary peg acts as a filler in shorter units when they are placed at the bottom of a stack configuration.

A vessel 32, 232, 262 may be pulled from a saddle 30, 230, 260, and a table lid 34, 234, 264 would be subsequently pulled from the vessel 32, 232, 262 to deconstruct the unit and allow for cleaning and refill while the table lid 34, 234, 264 is set on a surface with plant roots elevated in baskets. The components come in a variety of lengths and heights, allowing for creative configurations and the housing of a larger variety of plants if necessary. The pegs (e.g., primary legs 120 and secondary legs 122) can be stacked on top of one another to form leg assembly 124 in the form of a column for filling in spaces that would otherwise be empty, creating a structurally sound stack of units.

Any or more of the top basket openings 70, 240, 270 in each unit or peg can be filled with plants according to user preference.

What is claimed is:

1. A plant container assembly for a planter system comprising:
- a saddle defining at least one first leg cavity and at least one second leg cavity;
- a vessel supported by the saddle;
- at least one guide portion is defined by one of the saddle and the vessel;
- at least one guide recess is defined by one of the saddle and the vessel;
- a lid supported by the vessel;
- at least one basket supported by the lid; and
- at least one primary leg comprising a leg first portion and a leg second portion;
  wherein
- when the lid is supported by the vessel, the at least one guide portion engages the at least one guide recess;
- the leg first portion is sized and configured to be received by the first leg cavity;
- the leg second portion is sized and configured to be received by the second leg cavity; and
- the leg first portion of the at least one primary leg defines at least one primary leg cavity.

2. A plant container assembly as recited in claim 1, in which the saddle defines at least one end portion and a spacing portion.

3. A plant container assembly as recited in claim 1, further comprising:
- a plurality of saddles;
- a plurality of first leg cavities formed in each of the plurality of saddles;
- a plurality of second leg cavities formed in each of the plurality of saddles; and
- a plurality of primary legs; wherein
- at least one primary leg is arranged such that the leg first portion is received by the first leg cavity of a first of the plurality of saddles.

4. A plant container assembly as recited in claim 1, further comprising at least one secondary leg defining a secondary leg cavity; wherein
- the secondary leg is sized and configured to be received by the at least one second leg cavity formed in the saddle; and
- the secondary leg cavity is sized and dimensioned to receive the leg second portion.

5. A plant container assembly as recited in claim 1, in which the lid defines at least one wall configured to extend at least partly within a vessel chamber defined by the vessel.

6. A plant container assembly as recited in claim 1, in which:
- the vessel defines a plurality of vessel walls and a vessel chamber; and
- the lid defines a plurality of lid walls; wherein
- when the lid is supported by the vessel, the lid walls are configured to extend at least partly within the vessel chamber such that the lid walls frictionally engage the vessel walls.

7. A plant container assembly as recited in claim 1, in which: the primary leg cavity is sized and configured to receive a portion of a second primary leg.

8. A plant container assembly as recited in claim 7, further comprising:
- a plurality of saddles;
- a plurality of first leg cavities formed in each of the plurality of saddles;
- a plurality of second leg cavities formed in each of the plurality of saddles;
- a plurality of primary legs; wherein
- a first primary leg is arranged such that the leg first portion of the first primary leg is received by the first leg cavity of a first of the plurality of saddles; and
- a second primary leg is arranged such that the leg first portion of the second primary leg is received by the first leg cavity of a second of the plurality of saddles.

9. A plant container assembly as recited in claim 1, in which the leg second portion of the least one primary leg is arranged within the secondary leg cavity of the at least one secondary leg to form a leg assembly.

10. A plant container assembly as recited in claim 9, further comprising:
- a plurality of saddles;
- a plurality of leg assemblies; wherein
- each leg assembly is arranged to extend between two of the plurality of saddles.

11. A plant container system comprising:
- first and second plant container assemblies each comprising
  - a saddle defining at least one leg opening;
  - a vessel supported by the saddle;
  - at least one guide portion is defined by one of the saddle and the vessel;
  - at least one guide recess is defined by one of the saddle and the vessel;
  - a lid supported by the vessel;
  - at least one basket supported by the lid; and a plurality of leg assemblies each comprising at least one primary leg and at least one secondary leg defining a secondary leg cavity, where each leg assembly is configured to engage at least one leg opening of each of the first and second plant container assemblies; wherein when the lid is supported by the vessel, the at least one guide portion engages the at least one guide recess;

at least a portion of each primary leg is arranged within the secondary leg cavity of one of the plurality of secondary legs to form each leg assembly of the plurality of leg assemblies; and at least a portion of each leg assembly is arranged within the leg openings of the first and second plant containers such that the first and second plant containers are supported in a desired orientation relative to each other.

12. A plant container system as recited in claim 11, in which each lid defines:

at least one basket opening; and at least one basket support ledge; wherein the at least one basket is configured to extend at least partly through the at least one basket opening; and at least a portion of the at least one basket is configured to be supported by the at least one basket ledge.

13. A plant container system as recited in claim 11, in which each lid defines at least one bobber opening, the plant container assembly further comprising at least one bobber configured to be supported by the bobber opening for movement relative to the lid.

14. A plant container system as recited in claim 11, in which:

the vessel defines a plurality of vessel walls and a vessel chamber; and the lid defines a plurality of lid walls; wherein when the lid is supported by the vessel, the lid walls are configured to extend at least partly within the vessel chamber such that the lid walls frictionally engage the vessel walls.

15. A method of forming a plant container system comprising the steps of:

providing first and second plant container assemblies each comprising a saddle defining at least one leg opening;

a vessel supported by the saddle;

at least one guide portion is defined by one of the saddle and the vessel;

at least one guide recess is defined by one of the saddle and the vessel;

a lid supported by the vessel; and at least one basket supported by the lid;

providing a plurality of leg assemblies each comprising at least one primary leg and at least one secondary leg defining a secondary leg cavity, where each leg assembly is configured to engage at least one leg opening of each of the first and second plant container assemblies;

configuring the at least one guide portion to engage the at least one guide recess;

arranging at least a portion of each primary leg within the secondary leg cavity of one of the plurality of secondary legs to form each of the plurality of leg assembly; and arranging at least a portion of each leg assembly within the leg openings of the first and second plant containers such that the first and second plant containers are supported in a desired orientation relative to each other.

16. A method as recited in claim 15, in which each lid defines:

at least one basket opening; and at least one basket support ledge; further comprising the steps of configuring the at least one basket to extend at least partly through the at least one basket opening; and configuring at least a portion of the at least one basket to be supported by the at least one basket ledge.

17. A method as recited in claim 15, in which each lid defines at least one bobber opening, the plant container assembly further comprising the step of configuring the at least one bobber to be supported by the bobber opening for movement relative to the lid.

18. A method as recited in claim 15, in which:

the vessel defines a plurality of vessel walls and a vessel chamber; and the lid defines a plurality of lid walls; and when the lid is supported by the vessel, the lid is arranged relative to the vessel such that the lid walls extend at least partly within the vessel chamber such that the lid walls frictionally engage the vessel walls.

* * * * *